United States Patent [19]
Yamamoto

[11] Patent Number: 6,084,983
[45] Date of Patent: Jul. 4, 2000

[54] IMAGE READING DEVICE AND METHOD

[75] Inventor: Yasuhiro Yamamoto, Tokyo, Japan

[73] Assignee: Asahi Kogaku Kogyo Kabushiki Kaisha, Tokyo, Japan

[21] Appl. No.: 09/083,035

[22] Filed: May 22, 1998

[30] Foreign Application Priority Data

May 23, 1997 [JP] Japan ................................ 9-150210

[51] Int. Cl.[7] .................................................. G06K 9/00
[52] U.S. Cl. ........................ 382/167; 358/516; 358/518; 358/461; 348/223; 348/251; 348/655
[58] Field of Search .................................... 382/162–163, 382/167, 312, 305, 298–299; 358/515–524, 528, 527, 447–448, 504–506, 296, 461, 458; 348/222–224, 251, 655; 396/429

[56] References Cited

U.S. PATENT DOCUMENTS

| | | | |
|---|---|---|---|
| 4,911,552 | 3/1990 | Kurashige et al. | 348/224 |
| 4,987,485 | 1/1991 | Hirota | 358/516 |
| 5,298,979 | 3/1994 | Kim | 348/655 |
| 5,619,260 | 4/1997 | Miyadera | 348/223 |
| 5,619,347 | 4/1997 | Taniguchi et al. | 358/516 |
| 5,655,170 | 8/1997 | Yamamoto et al. | 396/429 |
| 5,732,165 | 3/1998 | Suzuki et al. | 382/305 |
| 5,748,307 | 5/1998 | Nakamura et al. | 358/296 |
| 5,917,556 | 6/1999 | Katayama | 348/655 |

FOREIGN PATENT DOCUMENTS

| | | | |
|---|---|---|---|
| 0 530 793 A2 | 10/1993 | European Pat. Off. | H04N 9/73 |
| 0 586 204 A1 | 10/1993 | European Pat. Off. | H04N 9/73 |

*Primary Examiner*—Andrew W. Johns
*Assistant Examiner*—Ishrat Sherali
*Attorney, Agent, or Firm*—Greenblum & Bernstein, P.L.C.

[57] ABSTRACT

The image reading device has a white level correction coefficient calculation processor, in which a white level correction coefficient, used when performing a shading correction, is calculated for each pixel data outputted from a line sensor. An exposure measurement is performed so that a color correction coefficient is calculated. A combined correction coefficient, i.e. a product of the white level correction coefficient and the color correction coefficient is obtained, and a pre-scanning operation is performed to obtain pixel data. The pixel data is multiplied by the combined correction coefficient, so that the shading correction and the color correction are performed simultaneously as a combined correction.

9 Claims, 9 Drawing Sheets

IMAGE READING DEVICE AND METHOD

BACKGROUND OF THE INVENTION

1. Field of the Invention

The present invention relates to an image reading device in which an image recorded in a film, for example, is irradiated with a light beam and the image is read using a line sensor.

2. Description of the Related Art

Conventionally, there is known an image reading device in which a film is intermittently moved along a direction perpendicular to a longitudinal direction of a line sensor, so that an image is read line by line. Namely, while the film is stopped, a light beam outputted from a light source illuminates the film, so that one line image is sensed by the line sensor. After this sensing operation, the film is moved by a predetermined amount by a moving mechanism. The sensing operation and the movement are repeatedly carried out, so that one frame image is read.

A black level correction data is subtracted from one line of pixel data outputted from the line sensor, and then the black-level-corrected pixel data is multiplied by a white level correction coefficient, so that the black-level-corrected pixel data is further subjected to a shading correction. The white level correction coefficient is used for correcting an error generated mainly due to an unevenness in the radiation of light from the light source, and is obtained when the power source is turned on prior to loading a film on the image reading device.

One line of pixel data, having been subjected to the black level correction and the shading correction, is then multiplied by a color correction coefficient, so that a balance among the red, green and blue components of the image is adjusted. The color correction coefficient is calculated based on image data obtained by an exposure measurement performed prior to reading operations (i.e. a pre-scanning operation and a regular scanning operation) of the image, and is obtained whenever the image to be read is changed. For example, when six images recorded on one film are read, the color correction coefficient is obtained six times, while the white level correction coefficient may be obtained once, or may be obtained when a film holder, in which the film is held, is removed from the image reading device or retracted from a reading optical path through which the light beam passes.

Thus, the white level correction coefficient and the color correction coefficient are calculated under independent conditions, and in an image process, these coefficients are separately applied to one line of pixel data as the one line of pixel data is outputted from the line sensor. Therefore, a problem occurs in a conventional device wherein the required image-processing time is relatively long.

SUMMARY OF THE INVENTION

Therefore, an object of the present invention is to shorten a time necessary for performing the shading correction and the color correction.

According to the present invention, there is provided an image reading device in which an image, recorded on a color negative film, is read by an optical sensor with a relatively coarse pitch according to a first reading mode, and then the image is read by the optical sensor with a relatively fine pitch according to a second reading mode. The device comprises a white level correction coefficient calculation processor, a color correction coefficient calculation processor, a combined correction coefficient calculation processor, and a combined correction processor.

The white level correction coefficient calculation processor calculates a white level correction coefficient, used when performing a shading correction, for each pixel data outputted from the optical sensor. The white level correction coefficient is calculated prior to a reading operation according to the first reading mode. The color correction coefficient calculation processor calculates a color correction coefficient, used when performing a color correction on the image, based on a result of an exposure measurement carried out prior to the reading operation according to the first reading mode. The combined correction coefficient calculation processor calculates a product of the white level correction coefficient and the color correction coefficient to obtain a combined correction coefficient for each pixel data. The combined correction processor multiplies unprocessed pixel data of the image, obtained by reading operations of the first and second reading modes, by the combined correction coefficient, so that the shading correction and the color correction are performed simultaneously as a combined correction.

Further, according to the present invention, there is provided an image reading device in which an image, recorded on a color negative film, is read by an optical sensor. The device comprises a white level correction coefficient calculation processor, a color correction coefficient calculation processor, a combined correction coefficient calculation processor, and a combined correction processor.

The white level correction coefficient calculation processor calculates a white level correction coefficient, used when performing a shading correction, for each pixel data outputted from the optical sensor. The white level correction coefficient is calculated before the image is read by the optical sensor. The color correction coefficient calculation processor calculates a color correction coefficient, used when performing a color correction on the image, based on a result of an exposure measurement carried out before the image is read by the optical sensor. The combined correction coefficient calculation processor calculates a product of the white level correction coefficient and the color correction coefficient to obtain a combined correction coefficient for each pixel data. The combined correction processor multiplies unprocessed pixel data of the image, obtained by reading operations of the first and second reading modes, by the combined correction coefficient, so that the shading correction and the color correction are performed simultaneously as a combined correction.

BRIEF DESCRIPTION OF THE DRAWINGS

The present invention will be better understood from the description of the preferred embodiments of the invention set forth below, together with the accompanying drawings, in which.

DESCRIPTION OF THE PREFERRED EMBODIMENTS

The present invention will be described below with reference to embodiments shown in the drawings.

Figure 1:
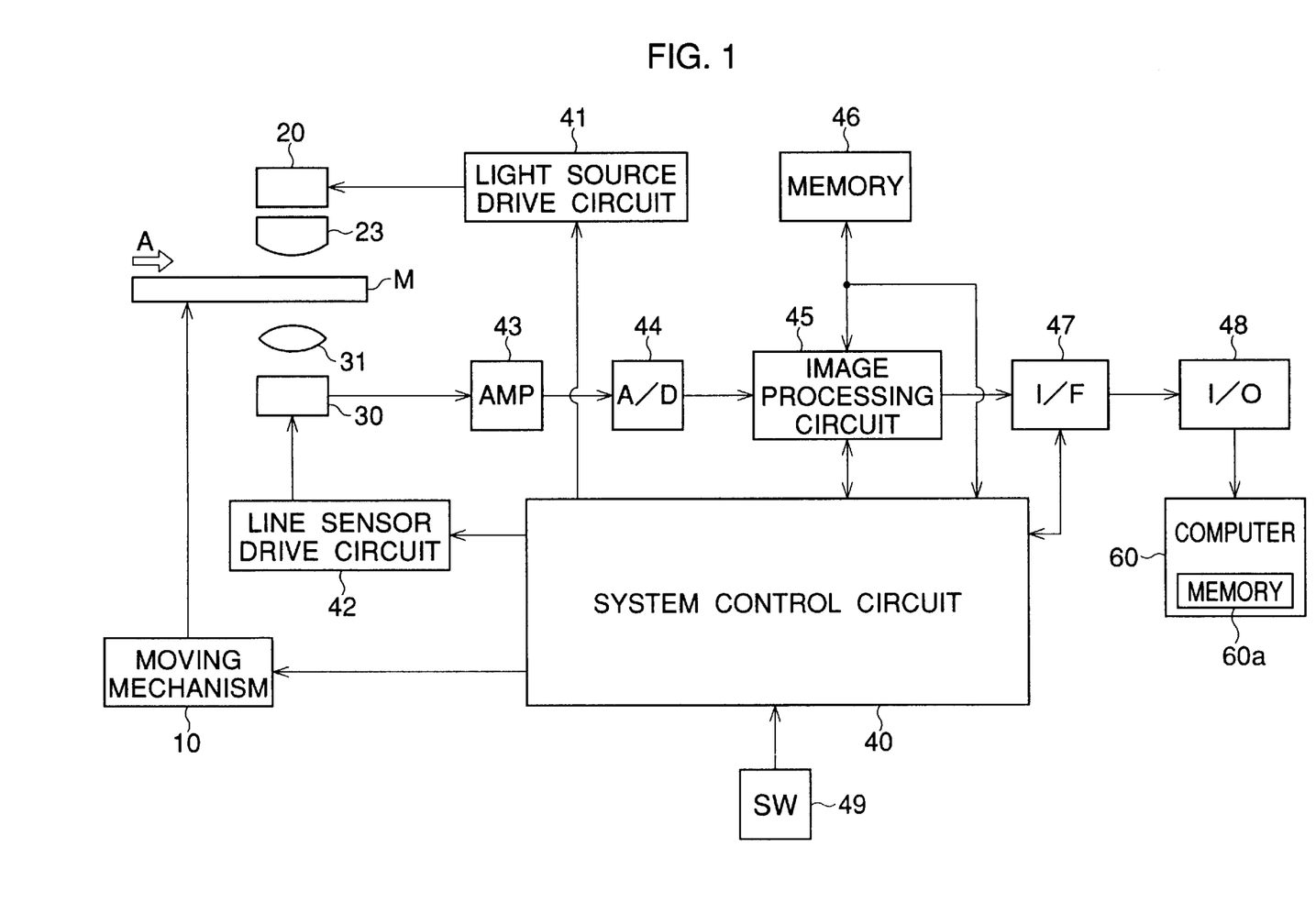
FIG. 1 is a block diagram showing an image reading device of a first embodiment of the present invention.

FIG. 1 shows an electrical structure of an image reading device of a first embodiment of the present invention.

A read object M, handled by this image reading device, is a transparent negative film on which a color image has been recorded. The read object M is intermittently moved, by a moving mechanism 10, in a direction shown by an arrow A.

A light source 20 and a cylindrical lens 23, provided below the light source 20, are disposed above a path along which the read object M is moved. A line sensor 30 and a forming lens 31, provided above the line sensor 30, are disposed under the path. The light source 20 is connected to a light source drive circuit 41, so that the light source 20 can be turned ON and OFF. The line sensor 30 is connected to a line sensor drive circuit 42, so that the color image can be read by the line sensor 30. The moving mechanism 10, the light source drive circuit 41 and the line sensor drive circuit 42 are controlled in accordance with a command signal outputted by a system control circuit 40.

The line sensor 30 is provided with a plurality of photo-diodes, which are aligned rectilinearly, whereby an electric signal, corresponding to the amount of light received by the photo-diode, is generated in each of the photo-diodes. The electric signal (i.e. the pixel data), read through the line sensor 30, is amplified by an amplifier 43 and is converted to a digital signal by an A/D converter 44. The digital pixel data is subjected to an image process, such as a shading correction, in an image processing circuit 45, and is then stored in a memory 46.

The pixel data, subsequent to being read from the memory 46, is subjected to a correction process, such as a gamma correction. Then, the pixel data is converted to a signal, which conforms to a predetermined format, by an interface circuit 47, and is outputted to an external computer (i.e. an image processing device) 60 through an input/output terminal 48. Thus, the image reading device and the external computer 60 can communicate with each other through the interface circuit 47 and the input/output terminal 48, so that various control operations can be performed in the image reading device and the external computer 60. The external computer 60 is provided with a memory 60a. Data outputted from the image reading device can be stored in the memory 60a, and data stored in the memory 60a can be read by the image reading device, under control of the system control circuit 40.

The image processing circuit 45 and the interface circuit 47 are controlled by the system control circuit 40.

In this embodiment, although all of the operations can be controlled by the external computer 60, a switch 49 may be connected to the system control circuit 40, so that various operations can be performed, such as reading the image recorded on the read object M, for example.

Figure 2:
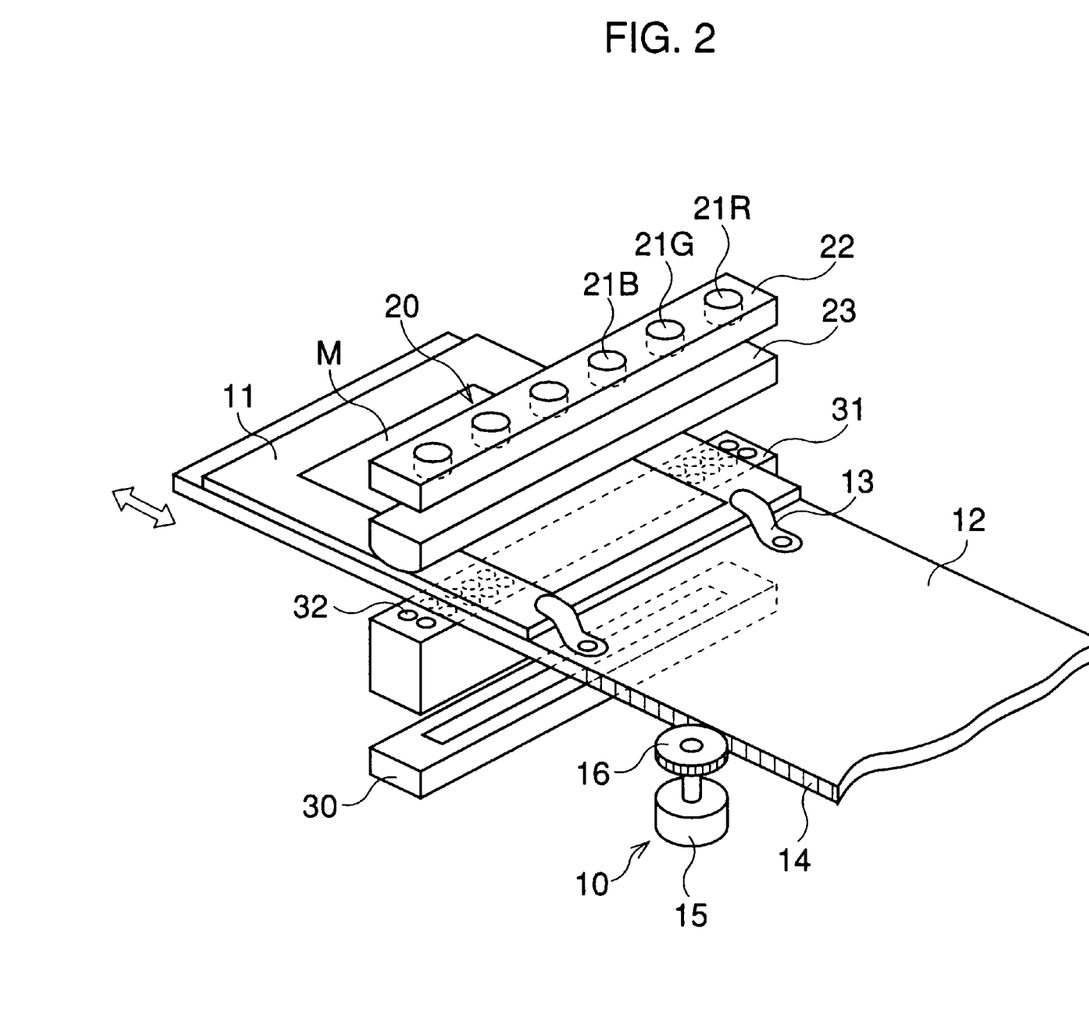
FIG. 2 is a perspective view showing a moving mechanism, a light source and a line sensor.

FIG. 2 shows the moving mechanism 10, the light source 20 and the line sensor 30. The read object M is supported by a frame 11, which is fixed on a plate stage 12 by a fastener 13. An opening (not shown) is formed in the stage 12 at a position corresponding to the read object M, so that a light beam radiated onto the read object M can pass through the read object M. A rack 14 is formed on a side surface of the stage 12. A pinion 16 fixed on an output shaft of a feeding motor 15 is meshed with the rack 14. The feeding motor 15, which is a stepping motor, for example, is driven under control of the system control circuit 40, so that the position and the moving speed of the read object M are controlled.

The light source 20, positioned above the stage 12, is provided with light-emitting diodes 21R, 21G and 21B, which radiate R(red), G(green) and B(blue) light beams, respectively. Note that, although only six light-emitting diodes are shown in FIG. 2, further light-emitting diodes may be provided. The light-emitting diodes 21R, 21G and 21B, supported by a slender support member 22, which extends in a breadth direction of the stage 12, are arranged in this order uniformly along the support member 22. The cylindrical lens 23, positioned between the support member 22 and the stage 12, is extended in parallel with the support member 22. Namely, light emitted by the light-emitting diodes 21R, 21G and 21B is condensed in a direction in which the stage 12 is moved, by the cylindrical lens 23, so that a line-shaped light beam is radiated onto the read object M.

The line sensor 30 is positioned under the light source 20, leaving a space therebetween, such that the stage 12 can be interposed between the light source 20 and the line sensor 30. The line sensor 30, the light source 20 and the cylindrical lens 23 are parallel to each other. Namely, the line sensor 30 extends in a direction approximately perpendicular to a direction in which the read object H is moved. The forming lens 31 is provided between the line sensor 30 and the stage 12. The forming lens 31, composed of a rod lens array 32, extends parallel to the line sensor 30. Accordingly, when a light beam is emitted onto the read object M, by the light source 20, the image recorded in the read object M is formed on the light receiving surface of the line sensor 30, through the forming lens 31.

Figure 3:
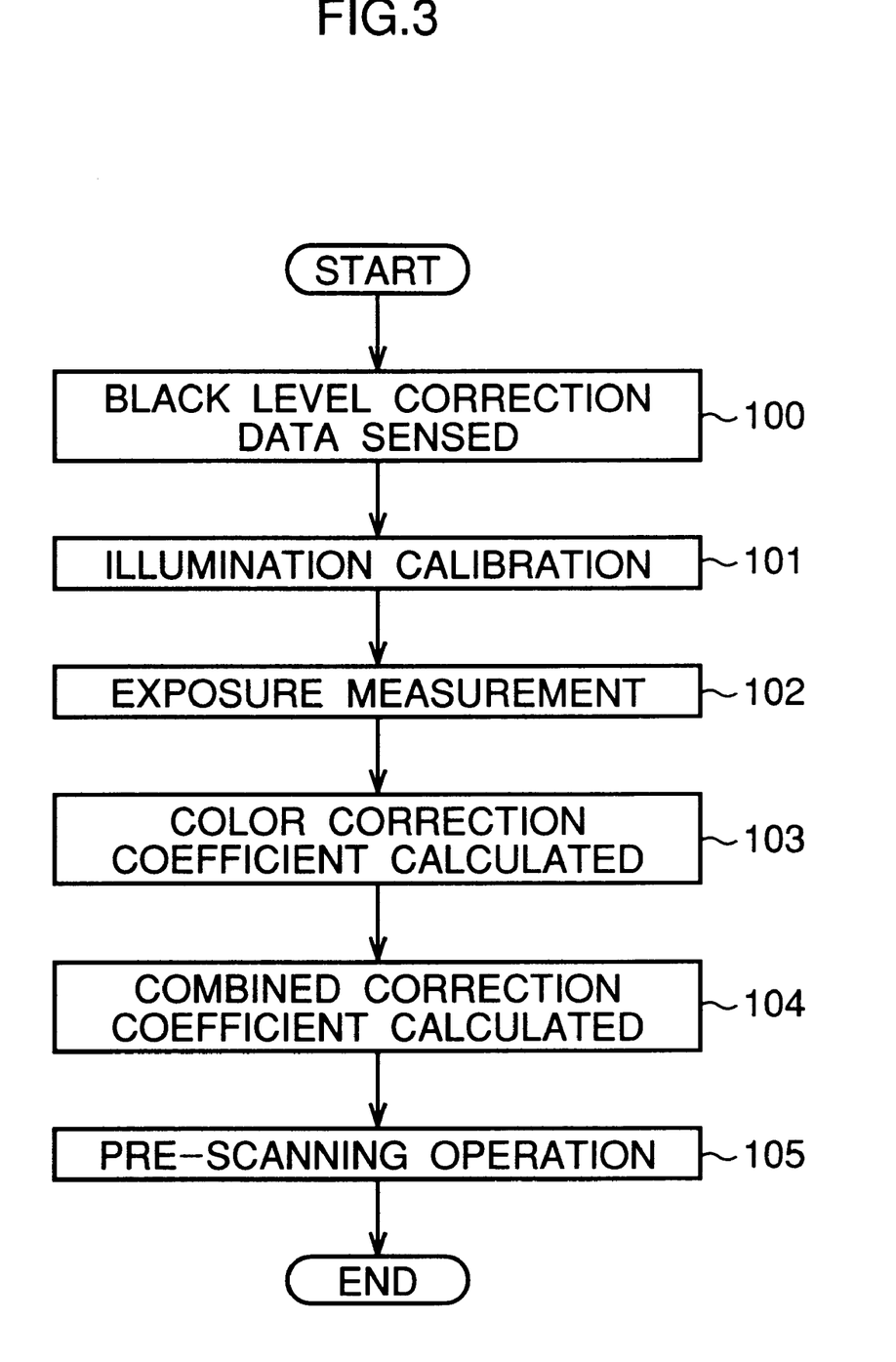
FIG. 3 is a flowchart of a correction coefficient calculation routine in the first embodiment.

FIG. 3 is a flowchart of a correction coefficient calculation routine utilized in the first embodiment. With reference to FIGS. 1 and 2, an image reading operation is described below.

The correction coefficient calculation routine is started by turning ON the electric power source of the image reading device. When this routine is started, the light source 20 is initially turned OFF. Thus, Step 100 is executed in a state in which the film M is not mounted on the stage 12, so that a black level correction data, which is pixel data generated in the line sensor 30 due to a dark current or an offset of a direct current component of each pixel, is sensed. In Step 101, the light source 20 is turned ON, and an illumination calibration is carried out, so that a white level correction coefficient, which is used for performing a shading correction, is obtained. The white level correction coefficient will be described later.

After the illumination calibration, the film M is mounted on the stage 12, and an exposure measurement is performed in Step 102. In the exposure measurement, the stage 12 is intermittently moved, via the moving mechanism 10, with a relatively coarse pitch. During the stationary intervals (i.e. while the stage 12 is stopped), an image recorded on the film M is sensed by the line sensor 30 with a predetermined accumulation time. Thus, an electric charge is accumulated on the line sensor 30 and a line image is sensed. Based on the pixel data of the line image sensed in the exposure measurement, an accumulation time required for each of the R, G and B components in a pre-scanning operation and a regular scanning operation is determined.

In Step 103, based on the pixel data obtained in the exposure measurement, a color correction coefficient, which is used for performing a color correction, is calculated. In Step 104, a product of the white level correction coefficient and the color correction coefficient is calculated, so that a combined correction coefficient is obtained. Then, regarding each of the R, G and B components, the white level correction coefficient, the black level correction data and the combined correction coefficient of each pixel are stored in the memory 46 in a predetermined order.

In Step 105, the pre-scanning operation (i.e. a first reading mode) is carried out, in which an image recorded in the film M is read line by line with a relatively coarse pitch in comparison with the regular scanning operation. Unprocessed pixel data of the image, read in the pre-scanning operation, is multiplied by the combined correction coefficient in the image processing circuit 45, so that the shading correction and the color correction are performed simultaneously as a combined correction. The corrected image is indicated on a surface of a display device of the computer 60. Similarly, in the regular scanning operation, which is carried out after the pre-scanning operation, the shading correction and the color correction are performed simultaneously as a combined correction, for each of the pixels.

Figure 4:
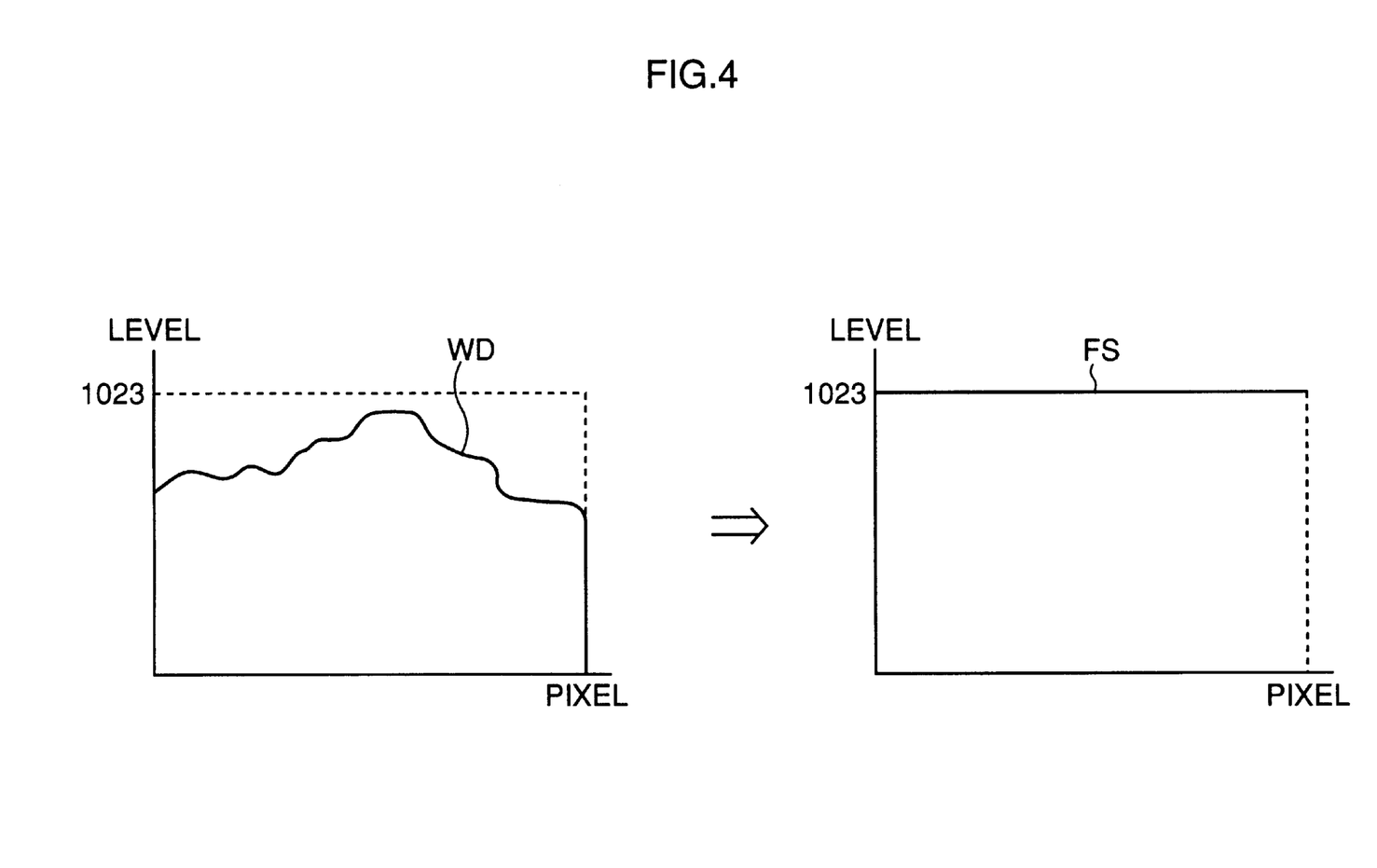
FIG. 4 is a histogram representation of a shading correction process.

FIG. 4 shows a shading correction process. As described above, the white level correction coefficient is obtained while the light source 20 is lit. Namely, the white level correction coefficient "WLC" is calculated according to the following formula (1), using the white level correction data WD generated in the line sensor 30, due to light directly entering the line sensor 30, and the black level correction data BD obtained in Step 100.

$$WLC = (1023/(WD-D)) \quad (1)$$

wherein "1023" corresponds to the full scale (i.e. 10 bits) FS of the A/D converter 44.

When an image on the film M is sensed by the line sensor 30, a black level correction data BD is contained in the pixel data PD, which is an output signal of the line sensor 30. Therefore, the shading correction is performed by multiplying a coefficient obtained when subtracting the black level correction data BD from the pixel data PD, by the white level correction coefficient WLC. Namely, the shading correction (i.e. a normalization of the pixel data) is carried out according to the following formula (2), so that a normalization data ND is obtained.

$$ND = WLC \times (PD-BD) \quad (2)$$

Figure 5:
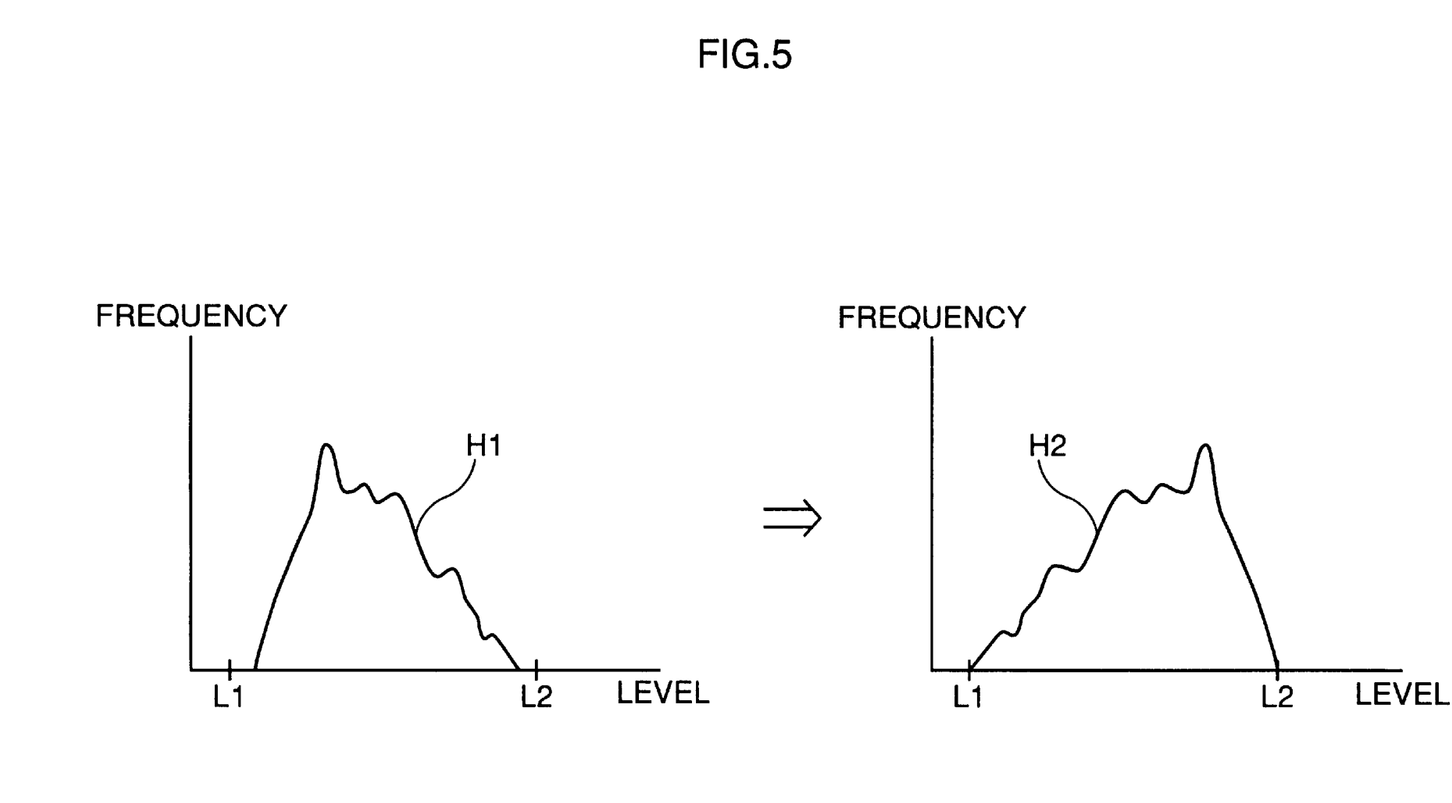
FIG. 5 is a histogram representation of a linear-reversal gradation correction process.

FIG. 5 shows a linear-reversal gradation correction process. Note that the reversal process in the linear-reversal gradation correction implies a negative/positive conversion, i.e. that a histogram H1, indicating a distribution of signal levels of pixel data obtained from an image recorded in a negative film, is changed to a histogram H2 indicating a distribution of signal levels in a positive state. The linear-reversal gradation correction is a process in which a gradation of an image is reversed, the maximum value and the minimum value of levels of the histogram are corrected so as to have predetermined values, and further the correction is linear. The normalization data ND obtained by the linear-reversal gradation correction is expressed by the following formula (3):

$$\begin{aligned} ND &= L2 - (ID - d) \times (L2 - L1)/(D - d) \\ &= L2 + ((L2 + L1)/(D - d)) \times d - \\ &\quad ((L2 - L1)/(D - d)) \times ID \end{aligned} \quad (3)$$

In the formula (3), "ID" is input data, "D" implies a maximum effective value, which is less than the maximum value of the histogram H1 by a predetermined amount, and "d" implies a minimum effective value, which is greater than the minimum value of the histogram H1 by a predetermined amount. "L1" and "L2" are a lower standard value and an upper standard value of a look-up-table (LUT), which is provided for performing various correction processes, such as a gamma correction. In the formula (3), from the term (ID–d), "d" is subtracted from the input data, so that the histogram is shifted leftward in FIG. 5. Multiplying by (L2–L1)/(D–d), the range of the histogram is converted to the range "L1" to "L2". By subtracting the calculated result from "L2", the histogram is reversed. Thus, the histogram H2 shown in FIG. 5 is obtained.

The linear-reversal gradation correction is carried out for the R, G and B components independently, so that separate coefficients (L2–L1)/(D–d) are obtained for the R, G and B components. Namely, each of these coefficients is the color correction coefficient, calculated in Step 103 of the flowchart shown in FIG. 3, which is used for balancing each of the color components when multiplied by the pixel data of each of the color components.

In this embodiment, according to the following formula (4) which is obtained by substituting "ND" of the formula (2) for "ID" of the formula (3), the pixel data outputted from the line sensor 30 is subjected to the shading correction and the color correction simultaneously as a combined correction.

$$\begin{aligned} ND &= L2 + ((L2 - L1)/(D - d)) \times d - \\ &\quad ((L2 - L1)/(D - d)) \times WLC \times (PD - BD) \\ &= OFV - ((L2 - L1) \times WLC/(D - d)) \times (PD - BD) \\ &= OFV - CCC \times (PD - BD) \end{aligned} \quad (4)$$

wherein "OFV" is an offset value of each of the photodiodes of the line sensor 30 and does not depend on the film M, and "CCC" is the combined correction coefficient which is a product of the white level correction coefficient and the color correction coefficient, i.e.:

$$CCC = ((L1-L2) \times WLC/(D-d))$$

which is obtained in Step 104 of the flowchart shown in FIG. 3. The white level correction coefficient "WLC" is obtained in Steps 100 and 101 of the flowchart shown in FIG. 3, before the film M is loaded in the image reading device, and as such does not depend on the film M.

Figure 6:
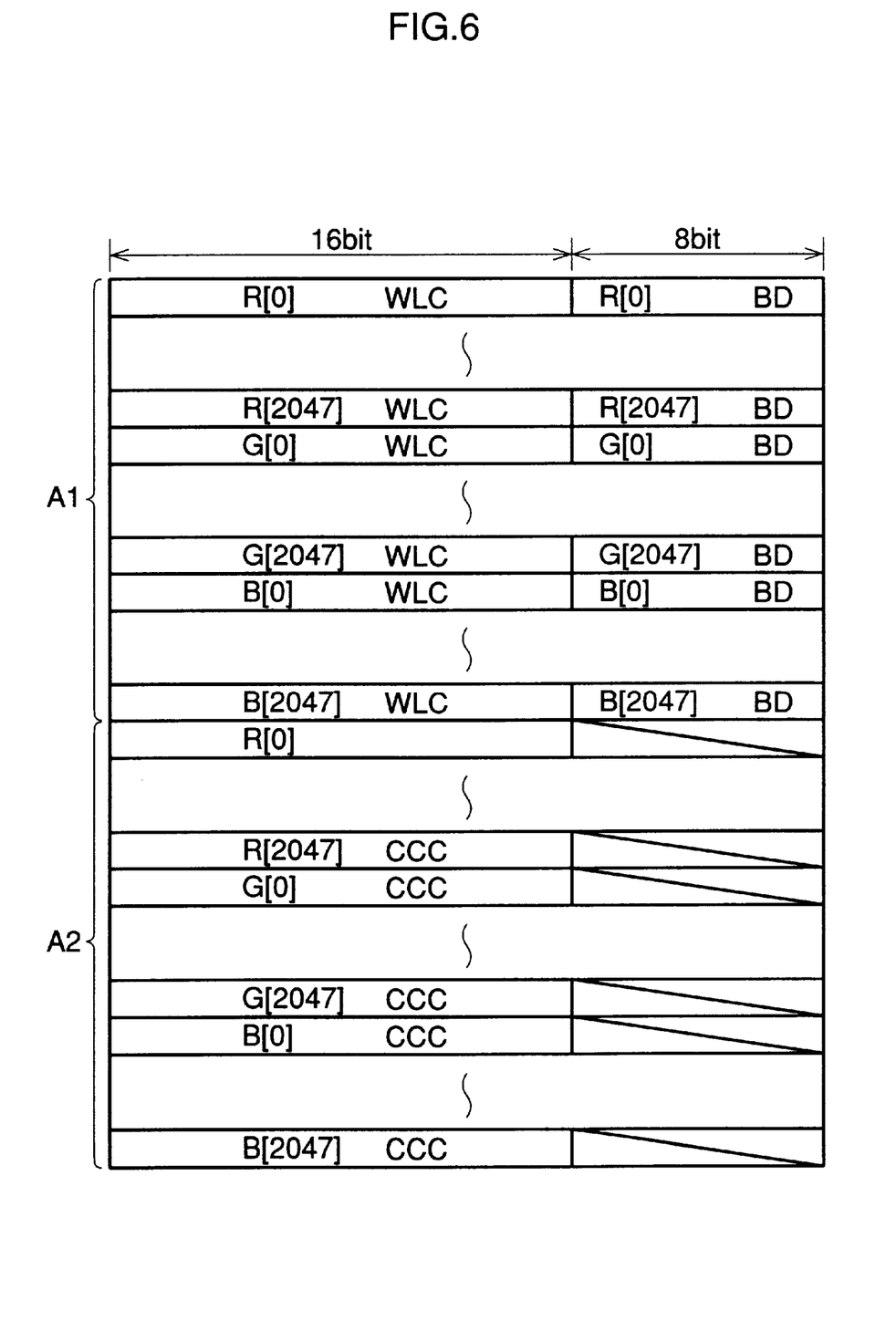
FIG. 6 is a view showing recording areas of a memory in which a white level correction coefficient, a black level correction data and a combined correction coefficient are stored.

FIG. 6 shows recording areas of the memory 46 in which the white level correction coefficient, the black level correction data and the combined correction coefficient are stored. As shown in this drawing, the white level correction coefficient, the black level correction data and the combined correction coefficient are stored for the R, G and B components, respectively. Further, in this example, the number of pixels or photo-diodes of the line sensor 30 is 2048, and a memory capacity of 24 bits for each of the pixels is provided. The white level correction coefficient WLC and the black level correction data BD are stored in a first recording area A1 of the memory 46, and the combined correction coefficient CCC is stored in a second recording area A2 of the memory 46.

In the first recording area A1, the white level correction coefficient is stored in a high-order 16 bit portion included in the available 24 bits, and the black level correction coefficient is stored in low-order 8 bit portion included in the 24 bits. The white level correction coefficient WLC and the black level data BD, which are related to the R components, are stored in addresses R[0] through R[2047]. The white level correction coefficient WLC and the black level data BD, which are related to the G components, are stored in addresses G[0] through G[2047]. The white level correction coefficient WLC and the black level data BD, which are related to the B component, are stored in addresses B[0] through B[2047].

In the second recording area A2, the combined correction coefficient is stored in a high-order 16 bit portion included in the available 24 bits, and no data is stored in a remaining low-order 8 bit portion. The combined correction coefficient CCC, which is related to the R component, is stored in addresses R[0] through R[2047]. The combined correction coefficient CCC, which is related to the G component, is stored in addresses G[0] through G[2047], and the combined correction coefficient CCC, which is related to the B component, is stored in addresses B[0] through B[2047]. Note that, in the second recording area A2, the black level correction data of the corresponding pixel may be stored in the remaining low-order 8 bit portion. Namely, for example, black level correction data stored in the address R[0] of the first recording area A1 may be stored in the low-order 8 bit portion of the address R[0] in the second recording area A2.

Figure 7:
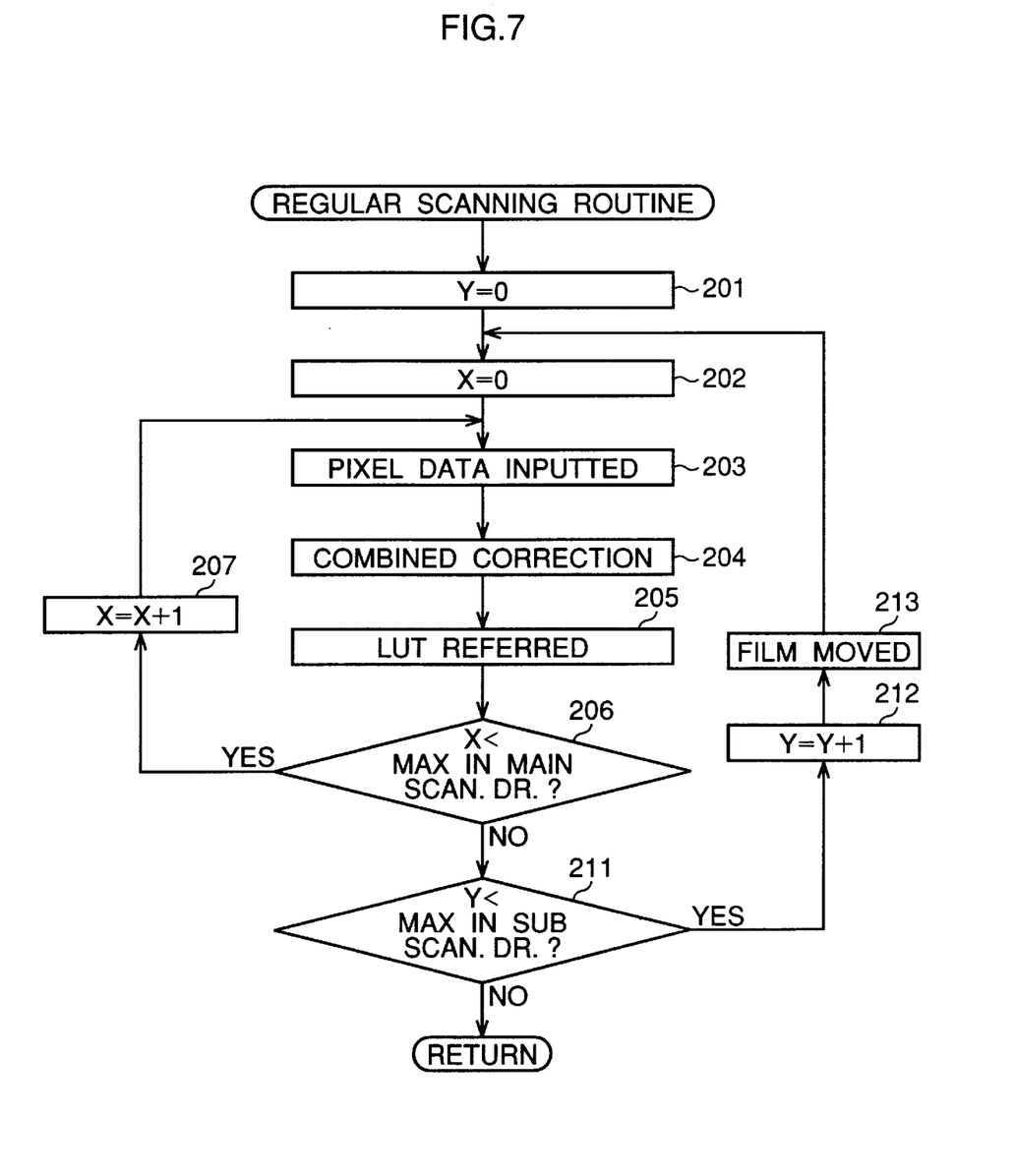
FIG. 7 is a flowchart of a subroutine for executing a regular scanning operation in the image reading operation.

FIG. 7 is a flowchart of a subroutine for executing a regular scanning operation in the image reading operation. With reference to FIGS. 1 and 7, the regular scanning operation is described below.

In Step 201, a parameter Y is set to 0, and in Step 202, a parameter X is set to 0. The parameter X indicates a position of a pixel of the line sensor 30, in a direction perpendicular to the arrow A, i.e. a pixel position in the main scanning direction. The parameter Y indicates a position of a pixel of the line sensor 30, in a direction parallel to the arrow A, i.e. a pixel position in the sub-scanning direction.

In Step 203, pixel data of a predetermined pixel position is sensed by the line sensor 30, and inputted into the image processing circuit 45. The pixel data, i.e. unprocessed data, is subjected to a calculation process according to the formula (4) in Step 204. Namely, black level correction data is subtracted from the unprocessed data, and then the unprocessed data is multiplied by a combined correction coefficient, the calculation result of which is subtracted from the offset value. Thus, a normalization data corresponding to the pixel data, having been subjected to the linear-reversal gradation correction, is obtained. The normalization data is used when accessing a look-up-table (LUT), which is provided for performing a gamma correction, in Step 205, so that pixel data, which has been subjected to the gamma correction, is outputted from the look-up-table.

In Step 206, it is determined whether the parameter X is less than the maximum value of the pixel position in the main scanning direction. When the parameter X is less than the maximum value, all of the pixel data of one line has yet to be subjected to the processes of Steps 204 and 205. Therefore, the parameter X is incremented by one in Step 207, and the process returns to Step 203. Namely, the next pixel data is subjected to the linear-reversal gradation correction, and the look-up-table is again referenced.

When it is determined in Step 206 that the parameter X has become greater than or equal to the maximum value of the pixel position in the main direction, Step 211 is executed in which it is determined whether the parameter Y is less than the maximum value of the pixel position in the sub-scanning direction. When the parameter Y is less than the maximum value, the pixel data of all of the lines has yet to be subjected to the processes of Steps 204 and 205. Therefore, the parameter Y is incremented by one in Step 212, and the film M is moved by one line in the direction of arrow A in Step 213. Then, the process returns to Step 202, so that pixel data of the next line is read and subjected to the processes of Steps 204 and 205.

Thus, according to the first embodiment, the combined correction coefficient, which is a product of the white level correction coefficient and the color correction coefficient, is calculated prior to the pre-scanning operation, and then, in the pre-scanning operation and the regular scanning operation, the pixel data, which is outputted from the line sensor 30, is normalized using the combined correction coefficient. Therefore, in comparison with a conventional process, in which the white level correction coefficient and the color correction coefficient are calculated separately, the calculation process is simplified, and the process time is reduced.

Figure 8:
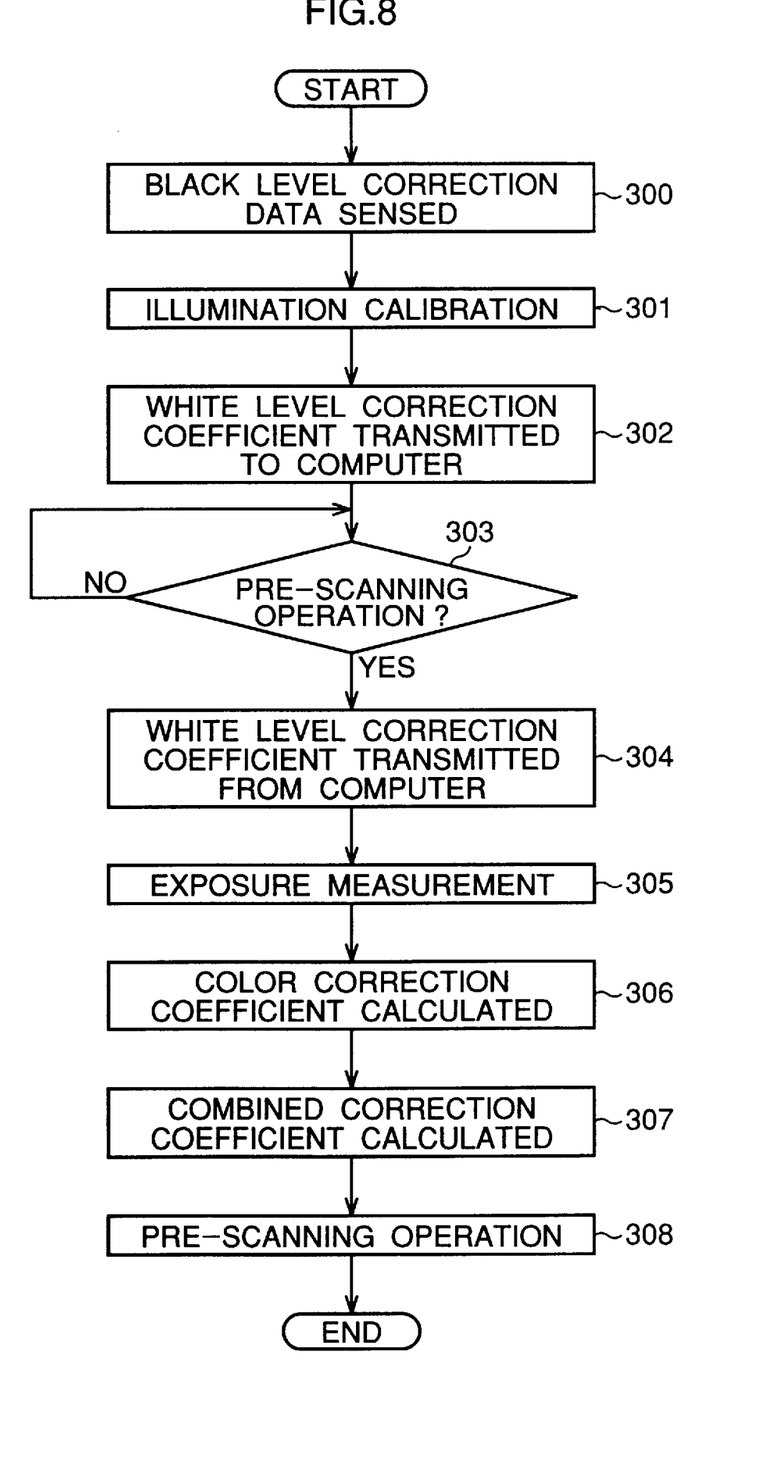
FIG. 8 is a flowchart generally showing a correction coefficient calculation routine utilized in a second embodiment.

FIG. 8 is a flowchart generally showing a correction coefficient calculation routine utilized in a second embodiment. In the second embodiment, although the white level correction coefficient, which has been obtained from the illumination calibration, is temporarily stored in the first area A1 of the memory, as shown in FIG. 6, subsequently, when the combined correction coefficient is calculated, the combined correction coefficient is overwritten on the address of the first area A1, in which the white level correction coefficient is stored. Namely, in the second embodiment, the second area A2, shown in FIG. 6, is not used. The other constructions are the same as those of the first embodiment.

The correction coefficient calculation routine is started by turning ON the power source of the image reading device, similar to the first embodiment. When this routine is started, the light source 20 is initially turned OFF, and Step 300 is executed in a state in which the film M is not loaded on the stage 12, so that black level correction data is sensed. In Step 301, the light source 20 is turned ON, and thus the illumination calibration is carried out, so that the white level correction coefficient for performing the shading correction is obtained. The data of the white level correction coefficient is transmitted to the computer 60 in Step 302, and is stored in the memory 60a provided in the computer 60.

Then, the film M is mounted on the stage 12. When it is confirmed in Step 303 that a command signal for starting the pre-scanning operation is inputted into the image reading device, by operating a switch (not shown), for example, Step 304 is executed. Namely, the data of the white level correction coefficient is read from the memory 60a, transmitted from the computer 60, and is stored in the first area A1 of the memory 46. In Step 305, a rough scanning operation (i.e. exposure measurement) is performed, so that an image recorded in the film M is read by the line sensor 30 with a relatively course pitch.

In Step 306, based on pixel data obtained by the exposure measurement, the color correction coefficient is calculated. In step 307, a product of the white level correction coefficient and the color correction coefficient is calculated to obtain a combined correction coefficient, which is overwritten at the same address of the first area A1 of the memory 46 as that of the corresponding white level correction coefficient.

In Step 308, the pre-scanning operation is carried out, so that the image recorded in the film M is read by the line sensor 30. The unprocessed data of the image, read through the pre-scanning operation, is subjected to the shading correction and the color correction applied simultaneously as a combined correction, by being multiplied by the combined correction coefficient, and is then indicated on a surface of the display device of the computer 60. The regular scanning operation is subsequently performed, and a similar correction is carried out for every pixel.

As described above, according to the second embodiment, the same effect as that of the first embodiment is obtained, with the added advantage that the area in the memory 46 can be reduced since the white level correction coefficient and the combined correction coefficient are stored at the same address.

Figure 9:
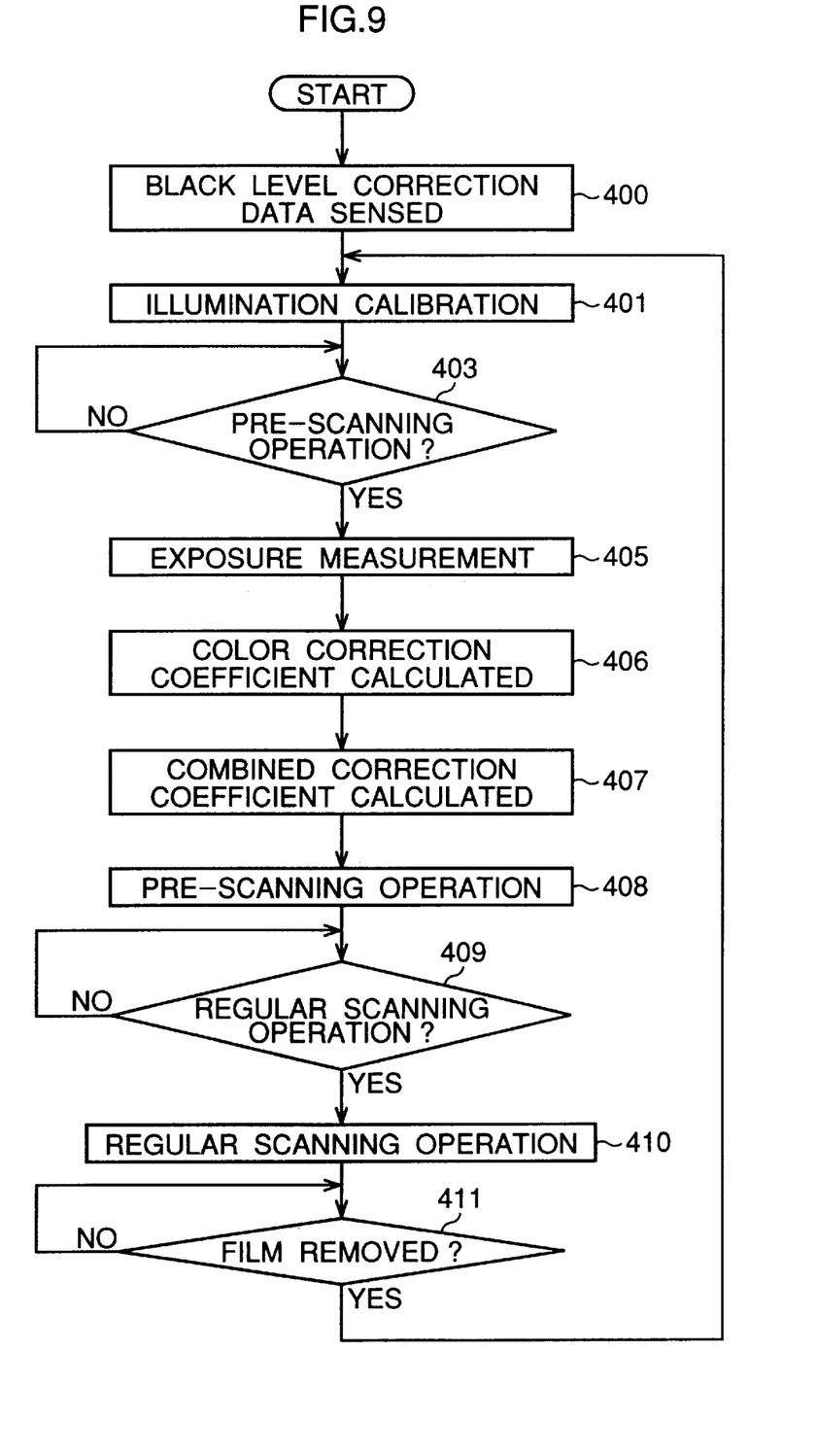
FIG. 9 is a flowchart generally showing a correction coefficient calculation routine utilized in a third embodiment.

FIG. 9 is a flowchart generally showing a correction coefficient calculation routine utilized in a third embodiment. In the third embodiment, although, at a specified address, the white level correction coefficient is overwritten by the corresponding combined correction coefficient, in a similar way as the second embodiment, the data of the white level correction coefficient is not transmitted to the computer 60, and the white level correction coefficient and the combined correction coefficient are obtained every time the film M is changed. The other constructions are the same as those of the first embodiment. Further, the Steps in the flowchart of FIG. 9, which correspond to the Steps in the flowchart of FIG. 8, use the same reference numerals with "100" added.

The correction coefficient calculation routine of the third embodiment is started by turning ON the power source of the image reading device, similar to the first embodiment. When this routine is started, the light source 20 is initially turned OFF. Step 400 is executed while the film M is not mounted on the stage 12, and thus a black level correction data is sensed. In Step 401, the light source 20 is turned ON, so that the illumination calibration is carried out, and thus the white level correction coefficient for the shading correction is obtained. After the illumination calibration, Step 403 is executed, in which it is determined whether the pre-scanning operation is to be started.

When a command signal for starting the pre-scanning operation is inputted into the image reading device, Step 405 is executed in which a rough scanning operation (i.e. exposure measurement) is performed. In Step 406, the color correction coefficient is calculated, and in step 407, a combined correction coefficient is calculated. Then, in Step 408, a pre-scanning operation is performed. When the pre-scanning operation is completed, it is determined in Step 409 whether a regular scanning operation is to be performed. When the regular scanning operation is to be performed, Step 410 is executed in which the regular scanning operation is performed. When the regular scanning operation is completed, it is determined in Step 411 whether the film M has been removed from the image reading device. When it is determined that the film M has been removed, the process returns to Step 401, so that the illumination calibration is again carried out.

Thus, in the third embodiment, the illumination calibration is carried out every time the regular scanning operation is completed. Namely, since the white level correction coefficient is obtained every time an image or the film M is changed, a process, in which the white level correction coefficient is transmitted to the computer 60, is not needed, and thus the control in increasingly simplified over the second embodiment.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. 9-150210 (filed on May 23, 1997) which is expressly incorporated herein, by reference, in its entirety.

What is claimed is:

1. An image reading device in which an image, recorded on a color negative film, is read by an optical sensor with a relatively coarse pitch according to a first reading mode, and then said image is read by said optical sensor with a relatively fine pitch according to a second reading mode, said device comprising:

a white level correction coefficient calculation processor that calculates a white level correction coefficient, used when performing a shading correction, for each pixel data outputted from said optical sensor, said white level correction coefficient being calculated prior to a reading operation according to said first reading mode;

a color correction coefficient calculation processor that calculates a color correction coefficient, used when performing a color correction on said image, based on a result of an exposure measurement carried out prior to said reading operation according to said first reading mode;

a combined correction coefficient calculation processor that calculates a product of said white level correction coefficient and said color correction coefficient to obtain a combined correction coefficient for said each pixel data; and a combined correction processor that multiplies unprocessed pixel data of said image, obtained by reading operations of said first and second reading modes, by said combined correction coefficient, so that said shading correction and said color correction are performed simultaneously as a combined correction.

2. A device according to claim 1, wherein said combined correction coefficient calculation processor calculates said combined correction coefficient prior to said reading operation according to said first reading mode.

3. A device according to claim 1, wherein, when said unprocessed pixel data is outputted from said optical sensor in said reading operations according to said first and second reading modes, said combined correction processor multiplies said unprocessed pixel data by said combined correction coefficient.

4. A device according to claim 1, further comprising a memory including a first recording area and a second recording area, said white level correction coefficient calculation processor storing said white level correction coefficient in said first recording area, and said combined correction coefficient calculation processor storing said combined correction coefficient in said second recording area.

5. A device according to claim 1, wherein said white level correction coefficient calculation processor transmits said white level correction coefficient to an image processing device connected to said image reading device prior to said reading operation according to said first reading mode, and said combined correction coefficient calculation processor multiplies said white level correction coefficient, read from said image processing device, by said color correction coefficient to obtain said combined correction coefficient when a negative film is loaded in said image reading device.

6. A device according to claim 5, wherein said image processing device comprises a memory, in which said white level correction coefficient is stored.

7. A device according to claim 1, wherein said white level correction coefficient calculation processor calculates said white level correction coefficient before a negative film is loaded in said image reading device.

8. An image reading device in which an image, recorded on a color negative film, is read by an optical sensor, said device comprising:

a white level correction coefficient calculation processor that calculates a white level correction coefficient, used when performing a shading correction, for each pixel data outputted from said optical sensor, said white level correction coefficient being calculated before said image is read by said optical sensor;

a color correction coefficient calculation processor that calculates a color correction coefficient, used when performing a color correction on said image, based on a result of an exposure measurement carried out before said image is read by said optical sensor;

a combined correction coefficient calculation processor that calculates a product of said white level correction coefficient and said color correction coefficient to obtain a combined correction coefficient for said each pixel data; and a combined correction processor that multiplies unprocessed pixel data of said image by said combined correction coefficient, so that said shading correction and said color correction are performed simultaneously as a combined correction.

9. An image reading method by which an image, recorded on a color negative film, is read by an optical sensor with a relatively coarse pitch according to a first reading mode, and then said image is read by said optical sensor with a relatively fine pitch according to a second reading mode, said method comprising:

step for obtaining a white level correction coefficient, used when performing a shading correction, for each pixel data outputted from said optical sensor, said white level correction coefficient being calculated prior to a reading operation according to said first reading mode;

step for obtaining a color correction coefficient, used when performing a color correction on said image, based on a result of an exposure measurement carried out prior to said reading operation according to said first reading mode;

step for calculating a product of said white level correction coefficient and said color correction coefficient to obtain a combined correction coefficient for said each pixel data; and step for multiplying unprocessed pixel data of said image, obtained by reading operations of said first and second reading modes, by said combined correction coefficient, so that said shading correction and said color correction are performed simultaneously as a combined correction.

* * * * *